(12) United States Patent
Zhou et al.

(10) Patent No.: US 11,882,469 B2
(45) Date of Patent: Jan. 23, 2024

(54) INTER-CELL MOBILITY ACROSS SERVING AND NON-SERVING CELLS

(71) Applicant: QUALCOMM Incorporated, San Diego, CA (US)

(72) Inventors: Yan Zhou, San Diego, CA (US); Fang Yuan, Beijing (CN); Mostafa Khoshnevisan, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/683,303

(22) Filed: Feb. 28, 2022

(65) Prior Publication Data

US 2022/0322115 A1 Oct. 6, 2022

Related U.S. Application Data

(63) Continuation of application No. PCT/CN2020/106224, filed on Jul. 31, 2020.

(51) Int. Cl.
*H04W 4/00* (2018.01)
*H04W 24/08* (2009.01)
*H04W 24/10* (2009.01)

(52) U.S. Cl.
CPC .......... *H04W 24/08* (2013.01); *H04W 24/10* (2013.01)

(58) Field of Classification Search
CPC . H04W 24/08; H04W 24/10; H04W 36/0058; H04W 36/0085; H04W 36/08; H04W 36/30; H04L 5/0048
See application file for complete search history.

(56) References Cited

U.S. PATENT DOCUMENTS

| 2010/0190488 A1* | 7/2010 | Jung | H04W 24/10 |
| | | | 455/67.11 |
| 2021/0105820 A1* | 4/2021 | Kim | H04B 7/022 |
| 2022/0322115 A1* | 10/2022 | Zhou | H04W 24/08 |

FOREIGN PATENT DOCUMENTS

| CN | 102684850 A | 9/2012 |
| CN | 103974316 A | 8/2014 |

(Continued)

OTHER PUBLICATIONS

Ericsson: "Details on Lower-Layer Mobility Enhancements", 3GPP TSG-RAN WG1 Meeting #97 Tdoc, R1-1907435, May 3, 2019 (May 3, 2019), 8 Pages, Sections 2-3.

(Continued)

*Primary Examiner* — Thai D Hoang
(74) *Attorney, Agent, or Firm* — Procopio, Cory, Hargreaves & Savitch LLP

(57) ABSTRACT

Inter-cell mobility across serving and non-serving cells based on layer 3 measurements is accomplished at the cost of increased delay. Inter-cell mobility across serving and non-serving cells based on layer 1 measurements minimized delay. A user equipment (UE) apparatus that is served by a serving cell of a base station receives, from the serving cell, a configuration to perform layer 1 (L1) measurements based on one or more reference signals from a non-serving cell. The UE also receives the one or more reference signals from the non-serving cell. The UE performs the L1 measurements on the one or more reference signals received from the non-serving cell based on the configuration received from the base station. The UE may perform the L1 measurements on a synchronization signal block (SSB), a channel state information reference signal (CSI-RS), or a positioning reference signal (PRS) from the non-serving cell.

22 Claims, 12 Drawing Sheets

(56) References Cited

FOREIGN PATENT DOCUMENTS

| CN | 110381531 A | * | 10/2019 | ........... H04B 17/318 |
|---|---|---|---|---|
| CN | 110381531 A | | 10/2019 | |
| EP | 3101946 A1 | * | 12/2016 | ........... H04W 24/10 |
| EP | 3349506 A1 | * | 7/2018 | ........... H04W 24/08 |
| WO | WO-2018143760 A1 | * | 8/2018 | ............... H04L 5/00 |
| WO | WO-2020052491 A1 | * | 3/2020 | ........... H04B 17/318 |
| WO | 2020092468 A1 | | 5/2020 | |

OTHER PUBLICATIONS

Ericsson: "Lower-Layer Mobility Enhancements", 3GPP TSG-RAN WG1 Meeting #98bis Tdoc, R1-1911226, Oct. 4, 2019 (Oct. 4, 2019), 11 Pages, Sections 2-3.

Ericsson: "Lower-Layer Mobility Enhancements", 3GPP TSG-RAN WG1 Meeting #99, 3GPP Draft, Tdoc R1-1912060, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019Nov. 22, 2019, pp. 1-11, Nov. 8, 2019 (Nov. 8, 2019), XP051819934, URL: https://ftp.3gpp.org/tsg_ran/WG1_RL1/TSGR1_99/Docs/R1-1912060.zip [retrieved on Nov. 8, 2019] abstract p. 3, Observation 3, sections 2, 2.1, 2.2.

International Search Report and Written Opinion—PCT/CN2020/106224—ISA/EPO—dated Apr. 25, 2021.

* cited by examiner

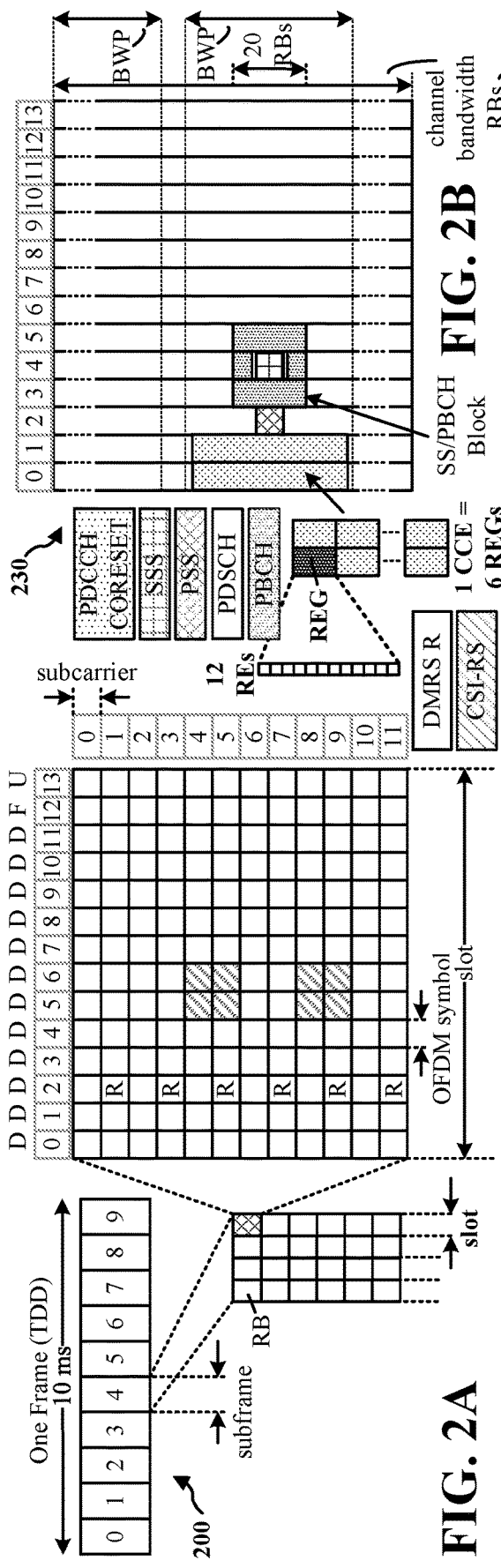
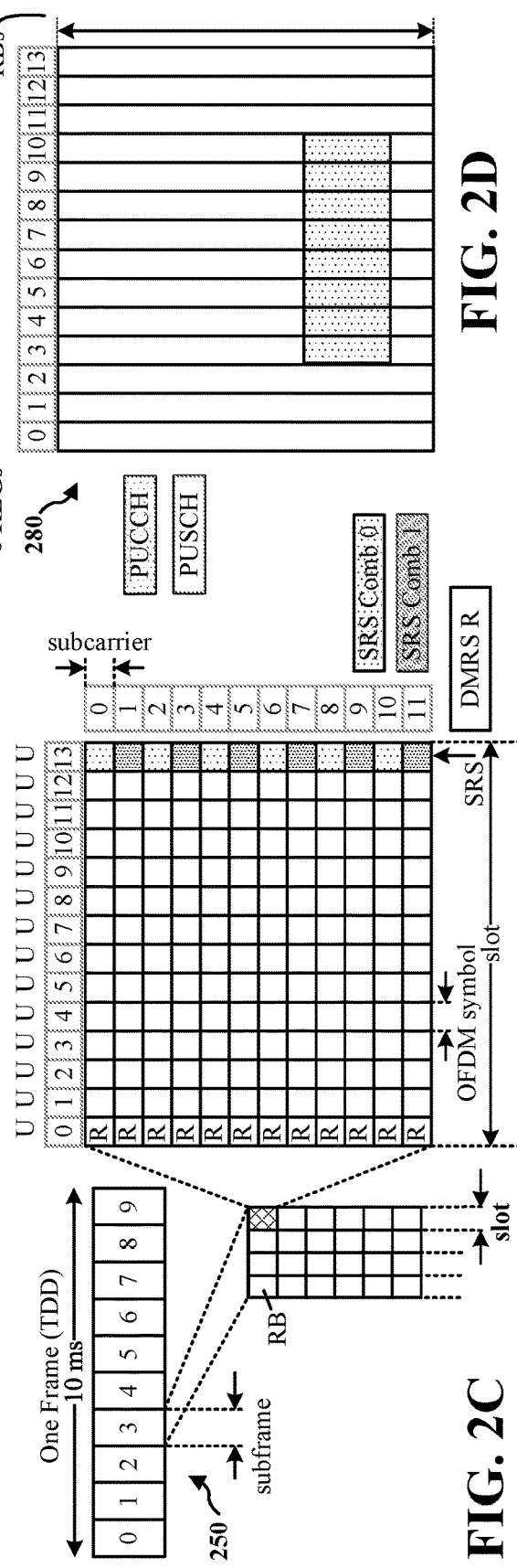
FIG. 2A
FIG. 2B
FIG. 2C
FIG. 2D

INTER-CELL MOBILITY ACROSS SERVING AND NON-SERVING CELLS

CROSS REFERENCE TO RELATED APPLICATION(S)

This application is a continuation of International Application Serial No. PCT/CN2020/106224, entitled, "INTER-CELL MOBILITY ACROSS SERVING AND NON-SERVING CELLS" and filed Jul. 31, 2020, which is expressly incorporated by reference herein in its entirety.

BACKGROUND

Technical Field

The present disclosure relates generally to communication systems, and more particularly, to inter-cell mobility based on beam switching across serving and non-serving cells.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Inter-cell mobility in a wireless communication system may be accomplished based on a layer 3 (L3) report generated by the user equipment (UE). The UE establishes a connection with a serving cell and generates the L3 report with metrics for neighboring non-serving cells. L3 measurements are useful for decisions that benefit from a long term view of channel conditions, however, the penalty of using L3 measurements for inter-cell mobility decisions is increased delay.

In an aspect of the disclosure, a method is provided. In the method, inter-cell mobility of a UE across serving and non-serving cells is based on layer 1 measurements to minimize delay. The UE apparatus that is served by a serving cell of a base station receives, from the serving cell, a configuration to perform layer 1 (L1) measurements based on one or more reference signals from a non-serving cell. The UE also receives the one or more reference signals from the non-serving cell. The UE performs the L1 measurements on the one or more reference signals received from the non-serving cell based on the configuration received from the base station. The UE may perform the L1 measurements on a synchronization signal block (SSB), a channel state information reference signal (CSI-RS), or a positioning reference signal (PRS) from the non-serving cell. The UE may also receive a configuration to report the L1 measurements of the one or more reference signals from the non-serving cell and report to the serving cell, the L1 measurements of the one or more reference signals received from the non-serving cell.

In an aspect of the disclosure, a method is provided. In the method, inter-cell mobility of a UE across serving and non-serving cells is based on layer 1 measurements to minimize delay. A base station apparatus exchanges communication with the UE via a serving cell and transmits to the UE, via the serving cell, a configuration for the UE to perform layer 1 (L1) measurements based on one or more reference signals from a non-serving cell. The base station may also transmit to the UE, via the serving cell, a configuration to perform the L1 measurements for at least one of a synchronization signal block (SSB), a channel state information reference signal (CSI-RS), or a positioning reference signal (PRS) from the non-serving cell. The base station may also transmit to the UE, via the serving cell, a configuration to report the L1 measurements of the one or more reference signals from the non-serving cell. The base station may also receive, from the UE via the serving cell, a report comprising the L1 measurements of the one or more reference signals from the non-serving cell. The base station may also activate a transmission configuration indication (TCI) state associated with the non-serving cell based on the report comprising the L1 measurements of the one or more reference signals from the non-serving cell.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
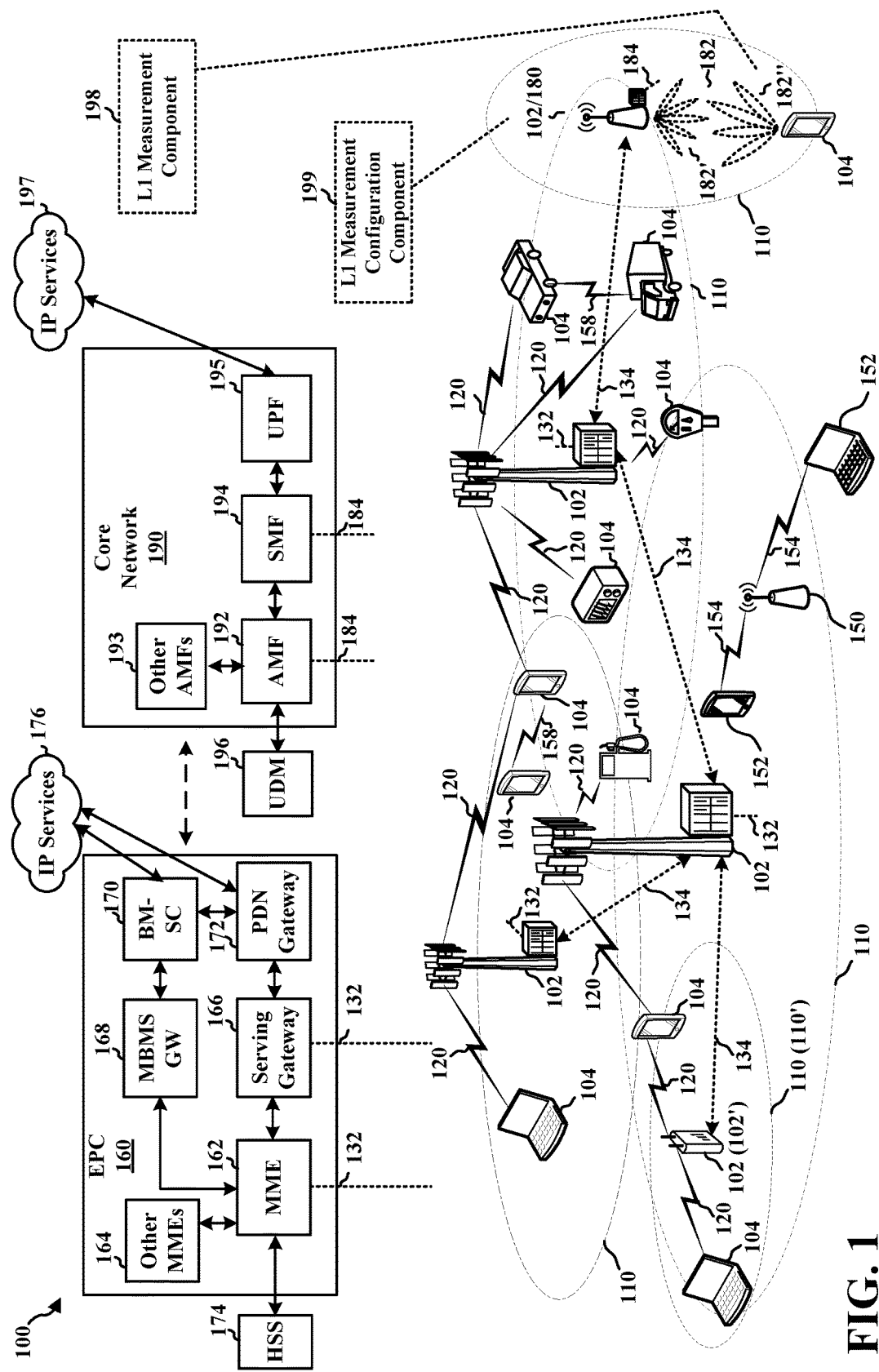
FIG. 1 is a diagram illustrating an example of a wireless communications system and an access network, in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include an L1 measurement component 198 that is configured to receive a configuration from a serving cell and perform layer 1 (L1) measurements based on one or more reference signals from a non-serving cell. The L1 measurement component 198 may also be configured to receive the one or more reference signals from the non-serving cell and perform the L1 measurements on the one or more reference signals received from the non-serving cell based on the configuration received from the base station. For example, the L1 measurement component 198 may perform the L1 measurements on a synchronization signal block (SSB), a channel state information reference signal (CSI-RS), or a positioning reference signal (PRS) from the non-serving cell. The L1 measurement component 198 may also be configured to report to the serving cell the L1 measurements of the one or more reference signals from the non-serving cell.

Referring again to FIG. 1, in certain aspects, a base station 102 or 180 may be include an L1 measurement configuration component 199 that is configured to exchange communication with a UE 104 via a serving cell and transmit to the UE 104, via the serving cell, a configuration for the UE 104 to perform L1 measurements based on one or more reference signals from a non-serving cell. The L1 measurement configuration component 199 may also be configured to transmit to the UE 104, via the serving cell, a configuration to perform the L1 measurements for at least one of a synchronization signal block (SSB), a channel state information reference signal (CSI-RS), or a positioning reference signal (PRS) from the non-serving cell. The L1 measurement configuration component 199 may also be configured to transmit to the UE 104, via the serving cell, a report configuration to report the L1 measurements of the one or more reference signals from the non-serving cell. The base station 102 or 180 may also receive, from the UE 104 via the serving cell, a report comprising the L1 measurements of the one or more reference signals from the non-serving cell, e.g., based on the configuration transmitted by the L1 measurement configuration component 199. The base station 102 or 180 may then activate a transmission configuration indication (TCI) state for the UE 104 that is associated with the non-serving cell based on the report comprising the L1 measurements of the one or more reference signals from the non-serving cell.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

Figure 3:
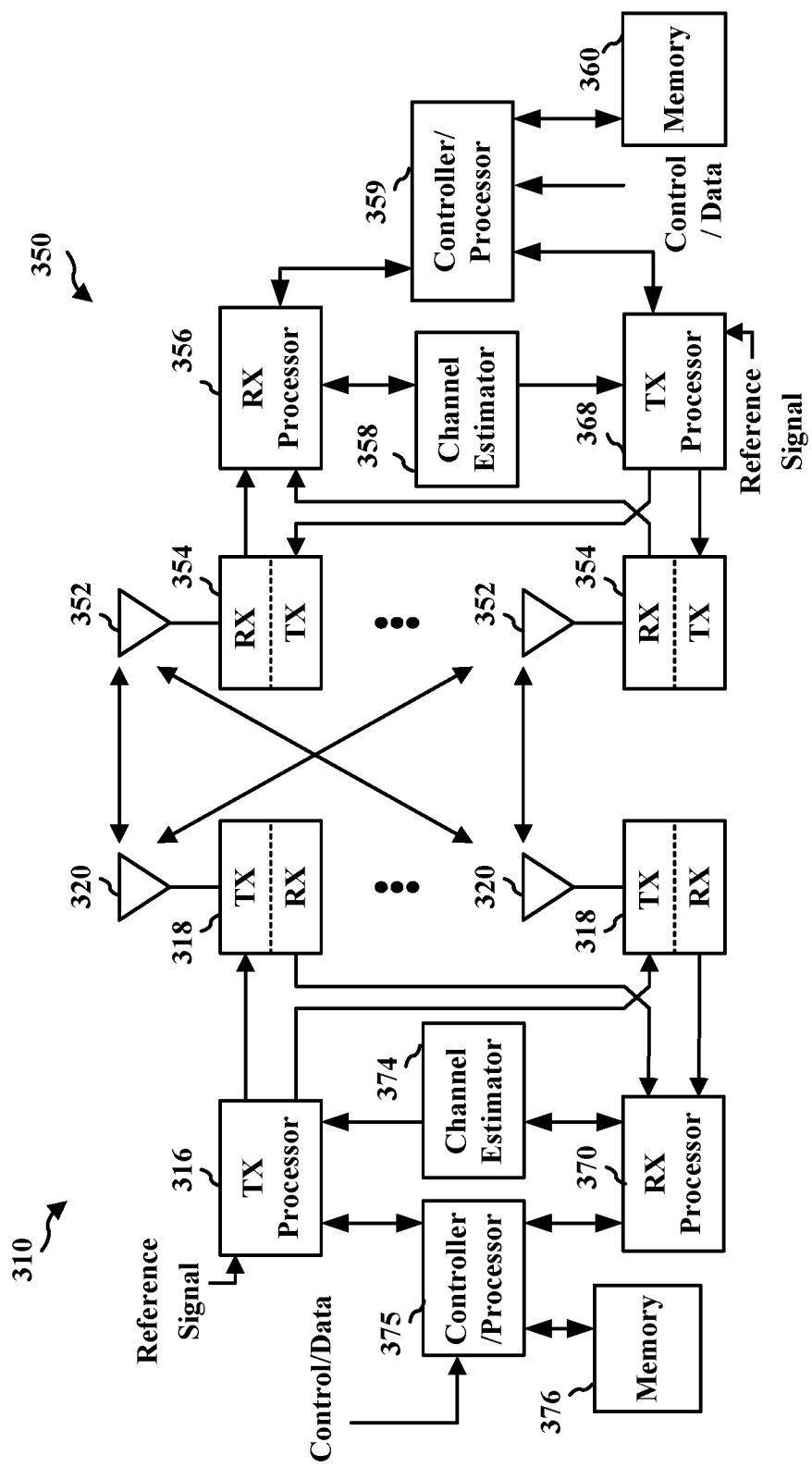
FIG. 3 is a diagram illustrating an example of a base station and user equipment, in accordance with various aspects of the present disclosure.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the L1 measurement component 198 of FIG. 1.

At least one of the TX processor 316, the RX processor 370, and the controller/processor 375 may be configured to perform aspects in connection with the L1 measurement configuration component 199 of FIG. 1.

Figure 4:
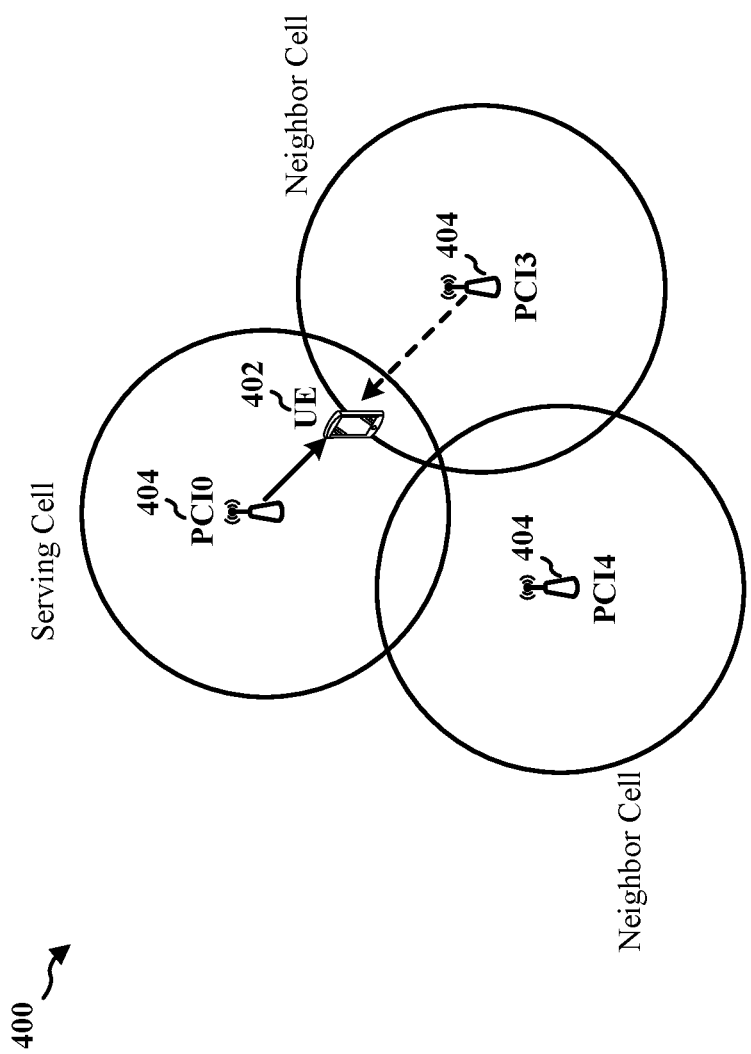
FIG. 4 is a diagram illustrating an example of a beam switching process, in accordance with various aspects of the present disclosure.

FIG. 4 is a diagram 400 illustrating an example of a beam switching process. The diagram 400 includes a UE 402 and a plurality of base stations 404. The UE is being served by PCI0 that is associated with a base station 404, while PCI 3 and PCI4 are neighbor cells. In the diagram 400 of FIG. 4, L1/L2 inter-cell mobility may occur via beam switching across serving and non-serving cells. In some instances, each serving cell may have a single or multiple TRPs (e.g., base station) sharing the same PCI. In the example of FIG. 4 includes a configuration with a single TRP per serving cell. A TCI state or spatial relation for the downlink/uplink beam of the serving cell may be quasi co-located (QCL) with SSB from the PCI of the same serving cell or a neighbor non-serving cell. For example, as shown in FIG. 4, the TCI state may be QCL with the SSB from PCI0. In some instances, the neighbor non-serving cell may be utilized to provide a beam indication.

Figure 5:
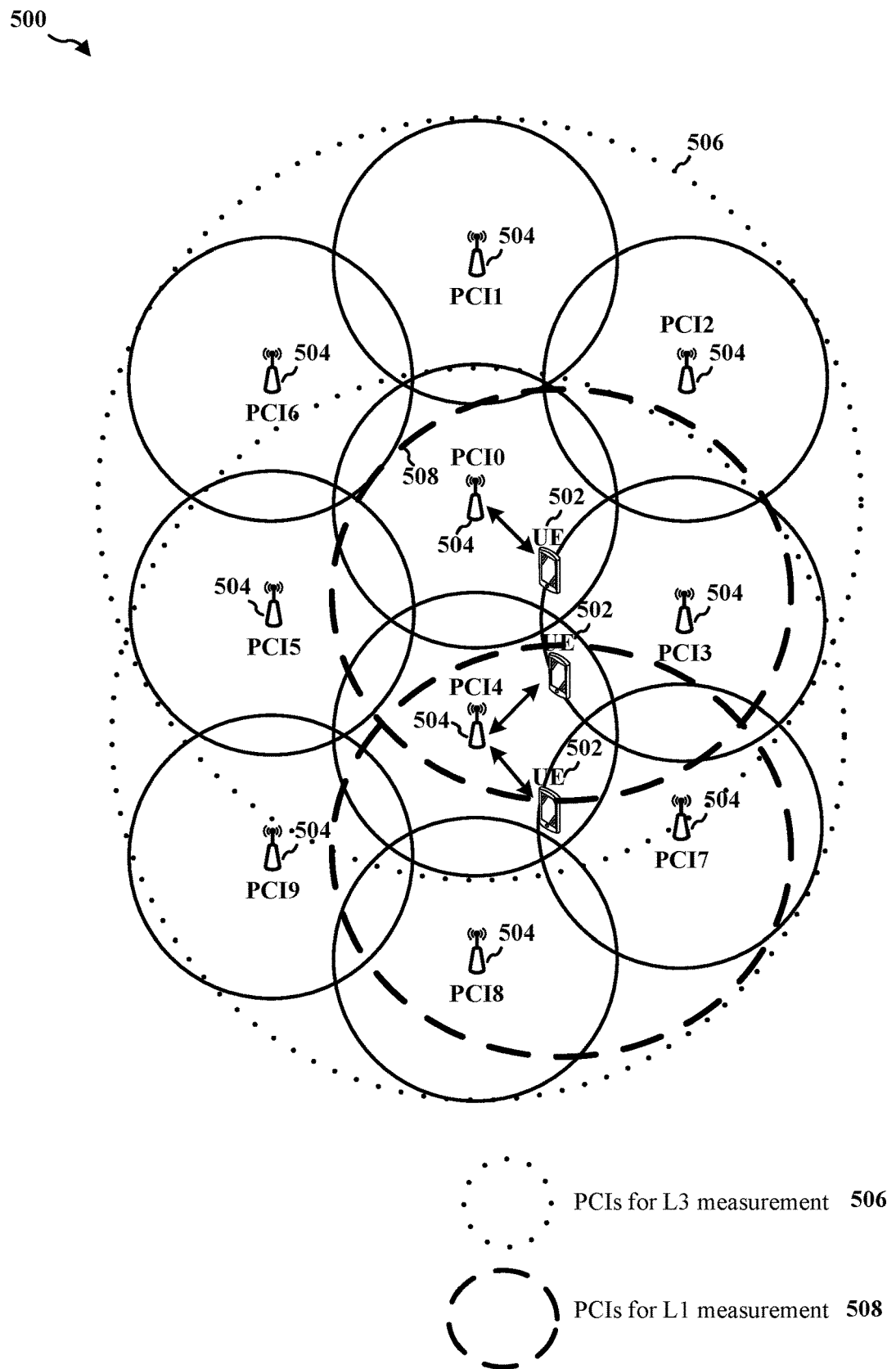
FIG. 5 is a diagram illustrating an example of the beam switching process, in accordance with various aspects of the present disclosure.

FIG. 5 is a diagram 500 illustrating an example of the beam switching process. The diagram 500 includes a UE 502 and a plurality of base station 504 and is configured similarly as the UE and the plurality of base stations of FIG. 4. For example, the UE 502 may enter a connected mode state after initial access (IA) on a serving cell with PCI0 504. The UE 502 may measure and report Layer3 (L3) metrics for the detected neighbor PCIs (e.g., PCI1-PCI6). The PCIs that may be included in the L3 measurement 506 may comprise PCI1-PCI6, as shown in FIG. 5. Based on the L3 measurements 506, the network may configure TCI states associated with a subset of the measured neighbor PCIs. For example, the network may configure TCI states associated with PCI0, PCI3, and PCI4, where PCI0, PCI3, and PCI4 are from neighbor non-serving cells. The UE may be further configured with L1 measurements for the configured TCI states. In some aspects, the PCIs (e.g., PCI0, PCI3, PCI4) may be defined as a set of PCIs for L1 measurement 508. For example, the UE may perform L1 measurements of PCI0, PCI3, and PCI4. Based on the L1 measurement, the network may activate a TCI state associated with a neighbor PCI to serve the UE 502. For example, based on the L1 measurements of PCI0, PCI3, and PCI4, the network may activate a TCI state associated with PCI4 to serve the UE 502. The UE may perform an updated L3 report. For example, the updated L3 report may include a different set of PCIs, e.g., PCI0, PCI3-PCI5, and PCI7-PCI9. Based on the updated L3 report, the network may handover the serving cell from PCI0 to PCI4. The network may also configure new TCI states associated with the updated L1 measurement PCI set, e.g., PCI4, PCI7, and PCI8.

Figure 6:
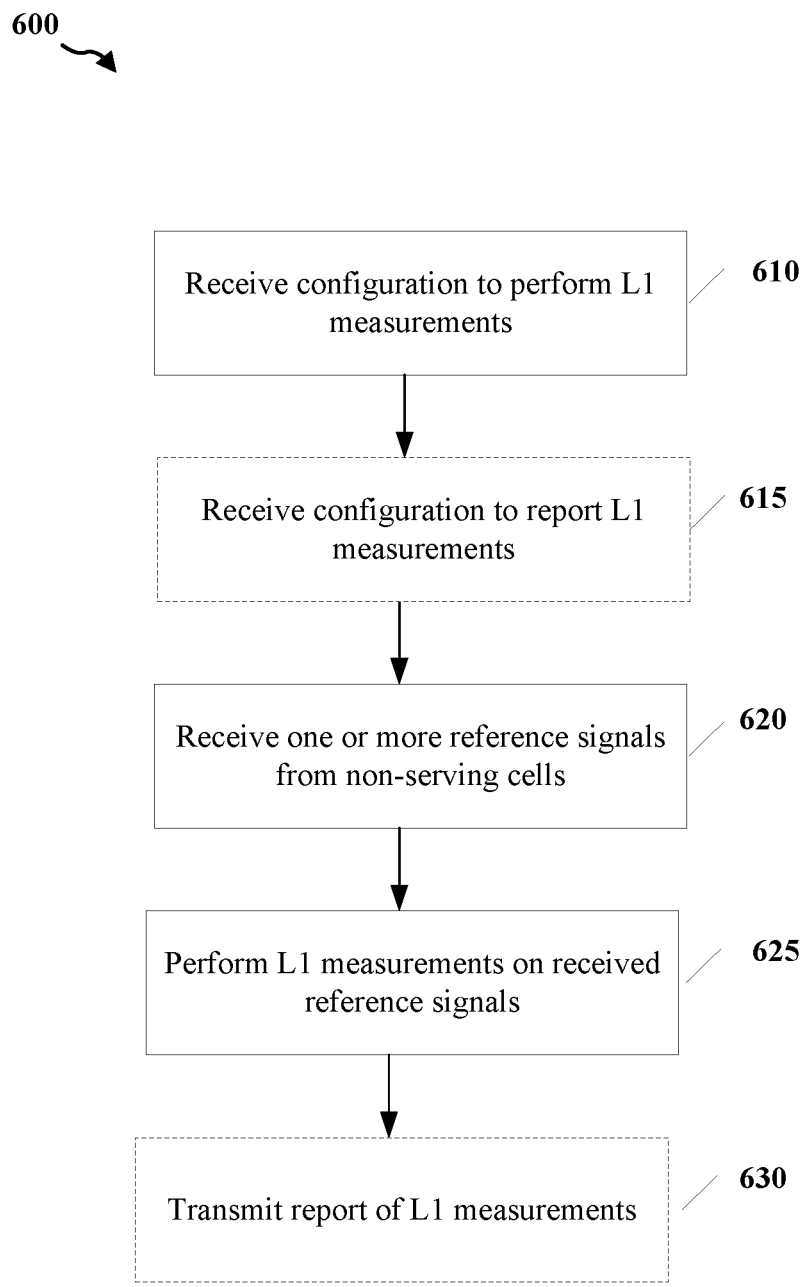
FIG. 6 is a flowchart of a method for wireless communication, in accordance with various aspects of the present disclosure.

FIG. 6 is a flowchart 600 of a method of wireless communication. The method may be performed by a UE (e.g., the UE 104; the apparatus 802) that is served by a serving cell of a base station (e.g., the serving cell of the base station 102; apparatus 902), to report L1 measurements of a non-serving cell, in accordance with various aspects of the present disclosure. Optional aspects are illustrated with a dashed line. The method may provide for improved mobility and coverage of a UE.

Figure 10:
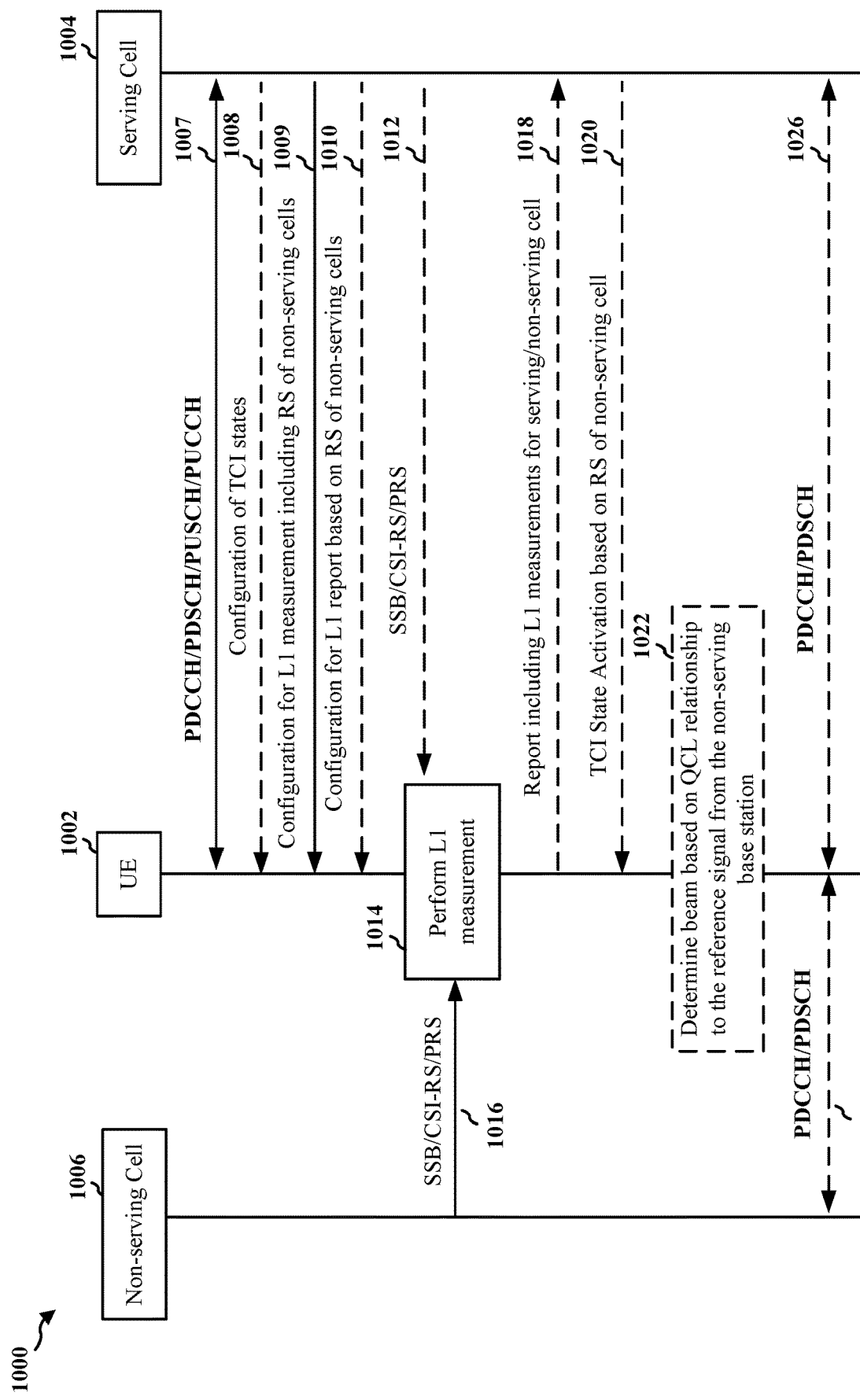
FIG. 10 illustrates an example communication flow between a UE and a serving cell and non-serving cell, in accordance with various aspects of the present disclosure.

At 610, the UE receives, from the serving cell, a configuration to perform L1 measurements based on one or more reference signals from one or more non-serving cells. For example, the reference signals may include at least one of a SSB, a CSI-RS, or a PRS. The reception of the configuration may be performed, e.g., by the reception component 830 and/or the configuration component 840 of the apparatus 802 in FIG. 8. FIG. 10 illustrates an example communication flow 1000 in which a UE 1002 receives a configuration 1009 for L1 measurements of one or more reference signals from a non-serving cell 1006.

In an aspect, the UE receives a channel state information (CSI) resource configuration to configure the UE to perform the L1 measurements. The CSI resource configuration may include, for each reference signal to be measured by the UE, a non-serving cell identifier. For example, the non-serving cell identifier can be a physical cell identity (PCI) or a transmission reception point (TRP) identifier.

Additionally, the CSI resource configuration may identify the reference signals to be measured from the one or more non-serving cells. In an aspect where the UE receives the CSI resource configuration to perform the L1 measurements on the SSB reference signals of the one or more non-serving cells, the CSI resource configuration may further identify certain characteristics to measure. These characteristics may include at least one of: a carrier frequency for the SSB from the non-serving cell, a half-frame index for the SSB from the non-serving cell, a subcarrier spacing (SCS) for the SSB from the non-serving cell, a period for the SSB from the non-serving cell, a synchronization signal/physical broadcast channel block measurement time configuration (SMTC) window configuration for the SSB from the non-serving cell, a time offset for the SSB from the non-serving cell, or a transmission power for the SSB from the non-serving cell.

In an aspect, the CSI resource configuration may indicate an SSB resource set that indicates a cell identifier for each SSB. For example, the SSB resource set may include an SSB resource list indicating a sequence of SSB indexes and a cell identifier list that indicates a sequence of cell identifiers associated with the sequence of SSB indexes. The cell identifier in the cell identifier list may be one to one mapped with the SS index in the SSB resource list. An example of such SSB resource set configuration is as below

```
CSI-SSB-ResourceSet-17 ::=      SEQUENCE {
    csi-SSB-ResourceSetId-r17       CSI-SSB-ResourceSetId-r17,
    csi-SSB-ResourceList-r17        SEQUENCE (SIZE(1..maxNrofCSI-SSB-
ResourcePerSet)) OF SSB-Index,
    csi-SSB-PcIList-r17             SEQUENCE (SIZE(1..maxNrofCSI-SSB-
ResourcePerSet)) OF PhysCellID
}
``` where the parameter csi-SSB-ResourceSetId-r17 configures the SSB resource set identifier, the list csi-SSB-ResourceList-r17 configures a sequence of SSB indexes, and the list csi-SSB-PcIList-r17 configures a sequence of physical cell identifiers for the sequence of SSB indexes.

In another aspect, the UE may determine to measure a serving cell SSB without measuring a non-serving cell SSB when the UE receives a CSI resource configuration without an associated cell identifier. An example of such SSB resource set configuration is as below

```
nzp-CSI-RS-SSB   SEQUENCE {
    ...
    CHOICE {
        csi-SSB-ResourceSetList   SEQUENCE (SIZE (1..maxNrofCSI-SSB-
ResourceSetsPerConfig)) OF CSI-SSB-ResourceSetId
        csi-SSB-ResourceSetList-r17 SEQUENCE (SIZE (1..maxNrofCSI-SSB-
ResourceSetsPerConfig-17)) OF CSI-SSB-ResourceSetId-r17
```

```
    }
...
}
``` where the configuration nzp-CSI-RS-SSB provides the reference signals for measurement, which choose between a SSB resource list without associated PCI which contains SSBs from the serving cell associated with the configuration, and a SSB resource list with associated PCI which contains SSBs from non-serving cell.

In an aspect where the CSI resource configuration identifies the CSI-RS for the L1 measurements of the one or more non-serving cells, the CSI resource configuration may include at least one of: a resource identifier (ID) for the CSI-RS of the non-serving cell, or a resource set ID for the CSI-RS of the non-serving cell.

In an aspect where the CSI resource configuration identifies the PRS for the L1 measurements of the one or more non-serving cells, the CSI resource configuration may include at least one of: a resource identifier (ID) for the PRS from the non-serving cell, or a resource set ID for the PRS from the non-serving cell.

In another aspect, the CSI resource configuration to perform the L1 measurements may include an indication for the UE to perform the L1 measurements without reporting the L1 measurements for the one or more non-serving cells.

In one aspect, as shown at 615, the UE may receive a report configuration to report the L1 measurements of the one or more reference signals from the one or more non-serving cells. The reception of the report configuration may be performed, e.g., by the configuration component 840 of the apparatus 802 in FIG. 8. FIG. 10 illustrates an example of the UE 1002 receiving a configuration 1010 for the L1 report including measurements based on at least one reference signal of the non-serving cell 1006. Although the configuration 1009 of the L1 measurements and the configuration 1010 of the L1 report are shown with two lines, in some examples, the configuration of the L1 measurement and the L1 report may be transmitted in the same message to the UE 1002. For example, both the CSI resource configuration and the CSI report configuration can be configured under a CSI measurement configuration. That is, one CSI measurement configuration includes both the CSI resource configuration and the CSI report configuration. In some aspects, the UE may not be configured with a report configuration for the L1 measurements of the one or more reference signals from the one or more non-serving cells. For example, when a CSI-RS resource set from non-serving cell with parameter "repetition" as ON, the UE may only measure the reference signals for reception beam refinement.

In an aspect, the configuration 1010 may configure the UE to report an L1 metric comprising at least one of: a layer 1 reference signal received power (L1-RSRP) for the one or more reference signals of the non-serving cell, a layer 1 reference signal received quality (L1-RSRQ) for the one or more reference signals of the non-serving cell, or a layer 1 signal to interference and noise ratio (L1-SINR) for the one or more reference signals of the non-serving cell. Additionally, the UE may report a reference signal identifier associated with each reported L1 metric. In some aspects, the reference signal identifier may comprise a resource identifier in a resource set associated with a cell identity. For example, the reference signal identifier is an absolute resource identifier, e.g. a resource identifier in a resource set identifier associated with a PCI or cell identifier. In some aspects, the reference signal identifier may comprise a relative identifier based on a configured order for the UE to measure a plurality of reference signals. For example, the reference signal identifier can be based on the order of measured reference signal in the CSI resource configuration.

At 620, the UE receives the one or more reference signals from the one or more non-serving cells. FIG. 10 illustrates the UE 1002 receiving an SSB, a CSI-RS, and/or a PRS from the non-serving cell 1006. The UE 1002 may also receive reference signals 1012 from the serving cell. The reception of the one or more reference signals from the non-serving cell may be performed by the reception component 830 and/or the reference signal component 842 of the apparatus 802 in FIG. 8, for example.

At 625, the UE performs the L1 measurements on the one or more reference signals received from the one or more non-serving cells based on the configuration received from the base station via the serving cell. For example, in FIG. 10, the UE 1002 performs the L1 measurements, at 1014, of the SSB, CSI-RS and/or PRS of the non-serving cell 1006. The UE may similarly perform L1 measurements of the reference signals 1012 from the serving cell 1004.

At 630, the UE may report, by transmitting to the serving cell, the L1 measurements of the one or more reference signals received from the one or more non-serving cells. The transmission of the report may be performed, e.g., by the report component 846 and/or the transmission component 834 of the apparatus 802 in FIG. 8. For example, FIG. 10 illustrates an example of the UE 1002 transmitting a report 1018 to the serving cell 1004 including the configured L1 measurements based on the SSB, CSI-RS, or PRS 1016 from the non-serving cell. In some examples, the UE may report, either together in report 1018 or in a separate report, L1 measurements for the reference signals 1012 from the serving cell.

In an aspect, the UE may report, in the report 1018, a subset of measured reference signals having a highest L1 metric or a lowest L1 metric across multiple cells associated with different physical cell identities (PCIs). For example, the UE may report a measured L1 metric for each of the subset of measured reference signals, in the report 1018. Also, the UE may report the measured L1 metric for a first reference signal and a relative L1 metric value for each of the remaining reference signals of the subset of measured reference signals, in the report 1018. In one aspect, the relative L1 metric value may be relative or differential to the measured L1 metric for the first reference signal.

In an aspect, the UE may report a subset of measured reference signals having a highest L1 metric or a lowest L1 metric per cell or per PCI for at least a subset of multiple cells associated with different physical cell identities (PCIs), in the report 1018. For example, the UE may report a measured L1 metric for each of the subset of measured reference signals, in the report 1018. Also, the UE may report the measured L1 metric for a first reference signal and a relative L1 metric value for each of the remaining reference signals of the subset of measured reference signals, in the report 1018. In one aspect, the relative L1 metric value may be relative or differential to the measured L1 metric for the first reference signal.

In another aspect, the UE may receive the configuration to the perform the L1 measurements for a physical cell identity (PCI) set including the serving cell and one or more non-serving cells.

In some examples, the L1 report 1018 may enable a base station to determine a beam for communication with the UE 1002. For example, if L1 measurements for the non-serving cell 1006 are better than the L1 measurements for the serving cell 1004, the UE may further receive a TCI state activation 1020 that activates a TCI state that is based on a reference signal from the non-serving cell 1006. Prior to receiving the TCI state activation 1020, the UE may receive a configuration of TCI states 1008 that includes at least one TCI state based on a reference signal from the non-serving cell. As an example, the UE 1002 may receive the configuration of the TCI states 1008 in RRC signaling from the serving cell 1004. Then, the serving cell may activate one of the configured TCI states for the UE 1002. The UE 1002 may use the activated TCI state to receive downlink communication. For example, the UE may determine, at 1022, a downlink beam for receiving downlink communication based on a QCL relationship to the reference indicated in the TCI state activation 1020. If the UE 1002 receives a TCI state activation 1020 based on a reference signal of the non-serving cells, the UE may perform a beam switch and may receive downlink communication 1024, such as PDCCH or PDSCH, from the non-serving cell. If the serving cell 1004 activates a TCI state based on a reference signal of the serving cell, the UE may use the indicated beam to receive downlink communication 1026, such as PDCCH or PDSCH, from the serving cell 1004.

Figure 11:
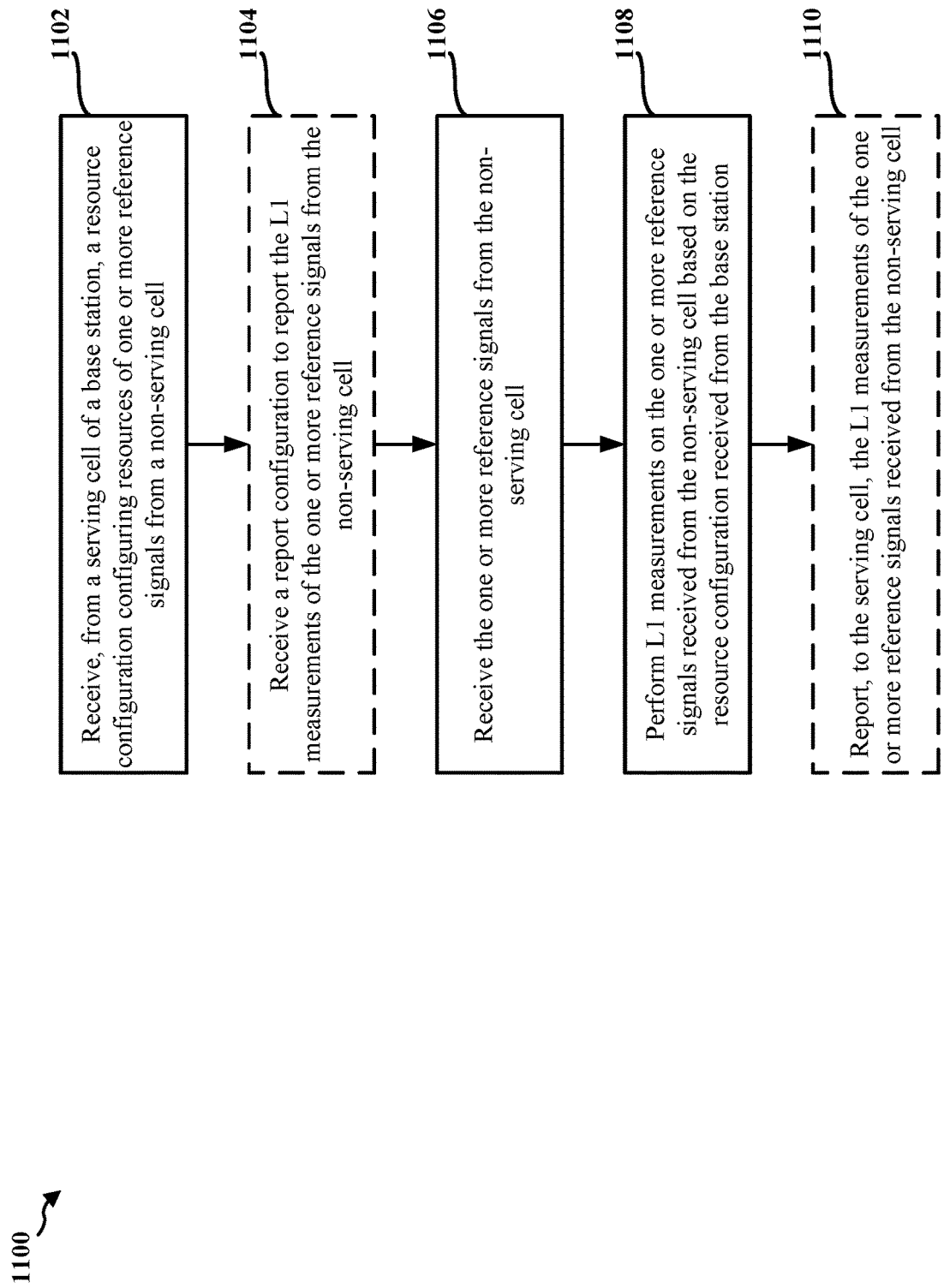
FIG. 11 is a flowchart of a method for wireless communication, in accordance with various aspects of the present disclosure.

FIG. 11 is a flowchart 1100 of a method of wireless communication. The method may be performed by a UE (e.g., the UE 104; the apparatus 802) that is served by a serving cell of a base station (e.g., the serving cell of the base station 102; apparatus 902), to perform L1 measurements on one or more reference signals from a non-serving cell, in accordance with various aspects of the present disclosure. Optional aspects are illustrated with a dashed line. The method may provide for improved mobility and coverage of a UE.

At 1102, the UE receives, from the serving cell, a resource configuration configuring resources of one or more reference signals from a non-serving cell. The one or more reference signals may include at least one of a SSB, a CSI-RS, or a PRS from the non-serving cell. The reception of the resource configuration may be performed, e.g., by a reception component 830 and/or a configuration component 840 of the apparatus 802 in FIG. 8. FIG. 10 illustrates an example communication flow 1000 in which a UE 1002 receives a configuration 1009 for L1 measurements of one or more reference signals from a non-serving cell 1006. The configuration 1009 may configure, at the UE 1002, resources of the one or more reference signals from the non-serving cell 1006.

In an aspect, the UE receives a channel state information (CSI) resource configuration to configure the resources of the one or more reference signals. The CSI resource configuration may include, for each reference signal to be measured by the UE, a non-serving cell identifier. For example, the non-serving cell identifier can be a physical cell identity (PCI) or a transmission reception point (TRP) identifier.

Additionally, the CSI resource configuration may identify the reference signals to be measured from the non-serving cell. In an aspect where the UE receives the CSI resource configuration to configure resources of SSB reference signals of the one or more non-serving cells, the CSI resource configuration may further identify certain characteristics to measure.

In an aspect, the CSI resource configuration may indicate an SSB resource set that indicates a cell identifier for each SSB. For example, the SSB resource set may include an SSB resource list indicating a sequence of SSB indexes and a cell identifier list that indicates a sequence of cell identifiers associated with the sequence of SSB indexes. The cell identifier in the cell identifier list may be one to one mapped with the SS index in the SSB resource list. An example of such SSB resource set configuration is as below

```
CSI-SSB-ResourceSet-17 ::=        SEQUENCE {
    csi-SSB-ResourceSetId-r17         CSI-SSB-ResourceSetId-r17,
    csi-SSB-ResourceList-r17          SEQUENCE (SIZE(1..maxNrofCSI-SSB-
ResourcePerSet)) OF SSB-Index,
    csi-SSB-PcIList-r17               SEQUENCE (SIZE(1..maxNrofCSI-SSB-
ResourcePerSet)) OF PhysCellID
}
``` where the parameter csi-SSB-ResourceSetId-r17 configures the SSB resource set identifier, the list csi-SSB-ResourceList-r17 configures a sequence of SSB indexes, and the list csi-SSB-PcIList-r17 configures a sequence of physical cell identifiers for the sequence of SSB indexes.

In one aspect, as shown at 1104, the UE may receive a report configuration to report the L1 measurements of the one or more reference signals from the non-serving cell. The reception of the report configuration may be performed, e.g., by the configuration component 840 of the apparatus 802 in FIG. 8. FIG. 10 illustrates an example of the UE 1002 receiving a configuration 1010 for the L1 report including measurements based on at least one reference signal of the non-serving cell 1006. Although the configuration 1009 of the L1 measurements and the configuration 1010 of the L1 report are shown with two lines, in some examples, the configuration of the L1 measurement and the L1 report may be transmitted in the same message to the UE 1002. For example, both the CSI resource configuration and the CSI report configuration can be configured under a CSI measurement configuration. That is, one CSI measurement configuration includes both the CSI resource configuration and the CSI report configuration. In some aspects, the UE may not be configured with a report configuration for the L1 measurements of the one or more reference signals from the one or more non-serving cells. For example, when a CSI-RS resource set from non-serving cell with parameter "repetition" as ON, the UE may only measure the reference signals for reception beam refinement.

In an aspect, the configuration 1010 may configure the UE 1002 to report an L1 metric comprising at least one of: a layer 1 reference signal received power (L1-RSRP) for the one or more reference signals of the non-serving cell, a layer 1 reference signal received quality (L1-RSRQ) for the one or more reference signals of the non-serving cell, or a layer 1 signal to interference and noise ratio (L1-SINR) for the one or more reference signals of the non-serving cell. Additionally, the UE may report a reference signal identifier associated with each reported L1 metric. In some aspects, the reference signal identifier may comprise a resource identifier in a resource set associated with a cell identity. For example, the reference signal identifier is an absolute resource identifier, e.g. a resource identifier in a resource set identifier associated with a PCI or cell identifier. In some aspects, the reference signal identifier may comprise a relative identifier based on a configured order for the UE to measure a plurality of reference signals. For example, the reference signal identifier can be based on the order of measured reference signal in the CSI resource configuration.

At 1106, the UE receives the one or more reference signals from the non-serving cell. FIG. 10 illustrates the UE 1002 receiving reference signals 1016 (e.g., an SSB, a CSI-RS, and/or a PRS) from the non-serving cell 1006. The UE 1002 may also receive reference signals 1012 (e.g., an SSB, a CSI-RS, and/or a PRS) from the serving cell. The reception of the one or more reference signals from the non-serving cell may be performed by the reception component 830 and/or a reference signal component 842 of the apparatus 802 in FIG. 8, for example.

At 1108, the UE performs the L1 measurements on the one or more reference signals received from the non-serving cell based on the resource configuration received from the base station, e.g., via the serving cell. For example, in FIG. 10, the UE 1002 performs the L1 measurements, at 1014, of the reference signals 1016 (e.g., the SSB, the CSI-RS and/or the PRS) of the non-serving cell 1006. The UE may similarly perform L1 measurements of the reference signals 1012 from the serving cell 1004.

Figure 8:
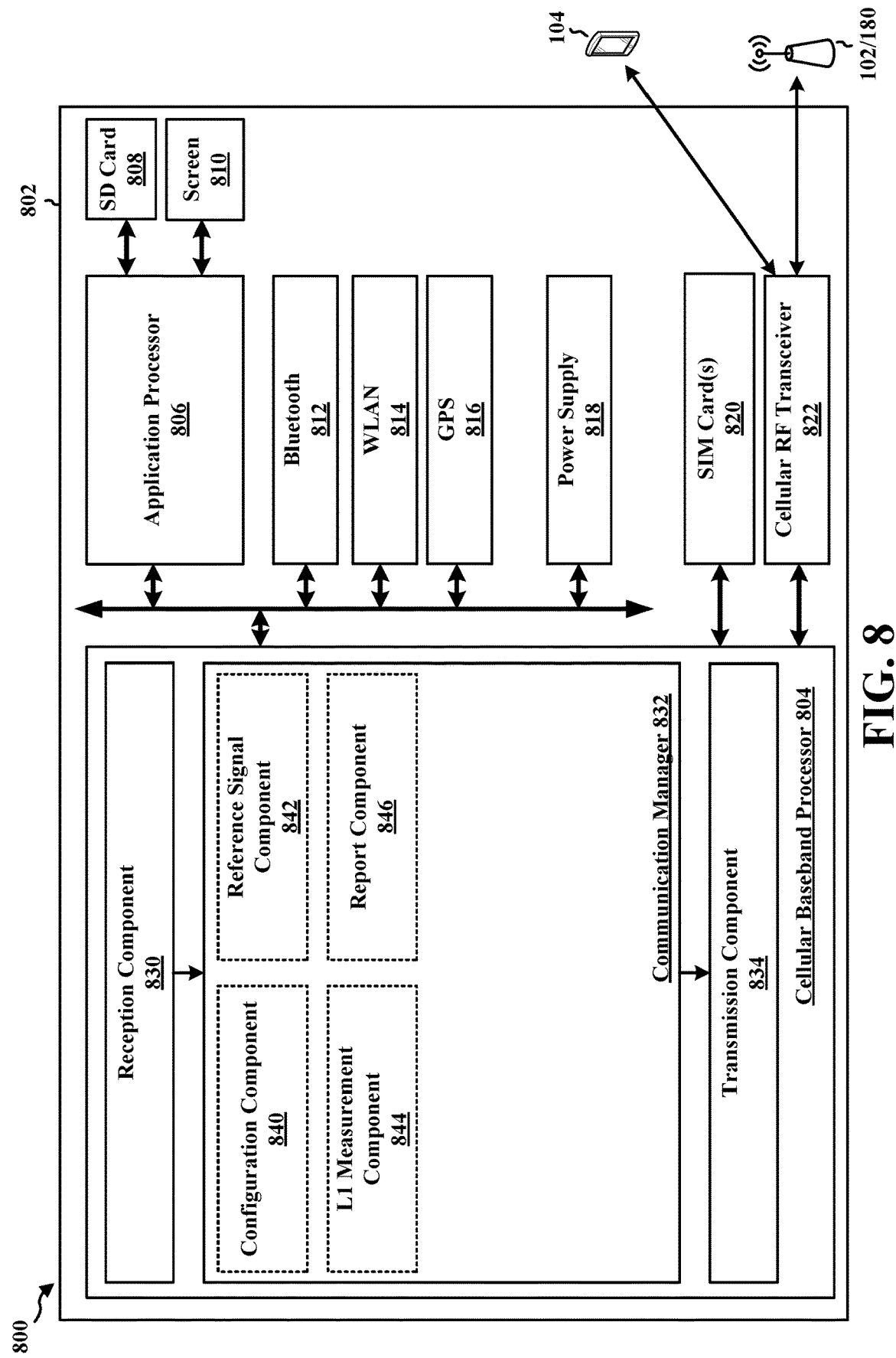
FIG. 8 is a diagram illustrating an example of a hardware implementation for an example apparatus.

At 1110, the UE may report, to the serving cell, the L1 measurements of the one or more reference signals received from the non-serving cells The transmission of the report may be performed, e.g., by the report component 846 and/or the transmission component 834 of the apparatus 802 in FIG. 8. For example, FIG. 10 illustrates an example of the UE 1002 transmitting a report 1018 to the serving cell 1004 including the configured L1 measurements based on the reference signals 1016 (e.g., the SSB, the CSI-RS, and/or the PRS) from the non-serving cell 1006. In some examples, the UE 1002 may report, either together in the report 1018 or in a separate report, L1 measurements for the reference signals 1012 from the serving cell.

Figure 7:
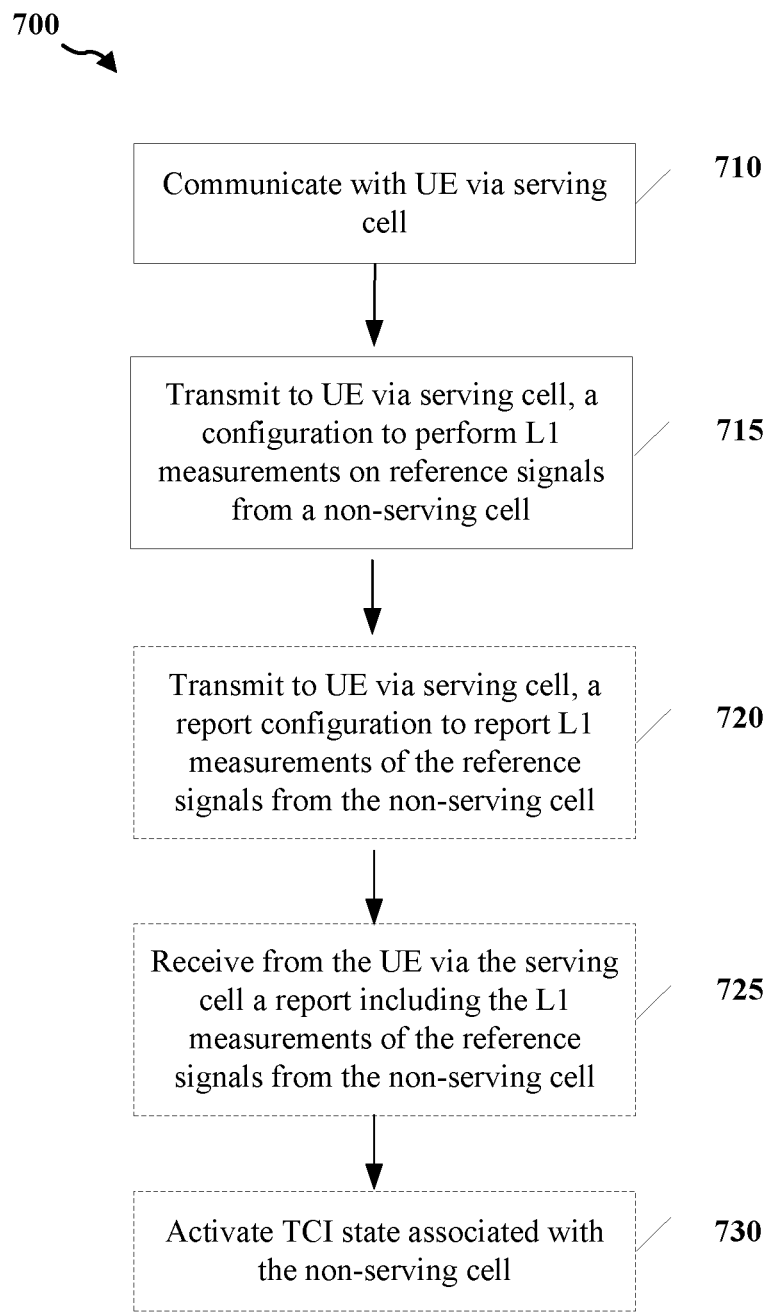
FIG. 7 is a flowchart of a method for wireless communication, in accordance with various aspects of the present disclosure.

FIG. 7 is a flowchart 700 of a method of wireless communication. The method may be performed by a base station (e.g., the base station 102/180; the apparatus 902) to configure a UE (e.g., the UE 104; the apparatus 802) to report L1 measurements of a non-serving cell, in accordance with various aspects of the present disclosure. Optional aspects are illustrated with a dashed line. The method may enable the base station to support improved mobility for a UE.

At 710, the base station communicates with the UE via a serving cell. For example, the exchange of communication may be performed by the reception component 930 and/or the transmission component 934 of the apparatus 902. For example, FIG. 10 illustrates a serving cell 1004 exchanging communication 1007 with a UE 1002. The communication 1007 may include PDCCH, PDSCH, PUCCH, and/or PUSCH.

At 715, the base station transmits to the UE via the serving cell a configuration for the UE to perform L1 measurements based on one or more reference signals from one or more non-serving cells. The transmission may be performed, e.g., by the configuration component 940 of the apparatus 902 in FIG. 9, for example. FIG. 10 illustrates an example of a base station transmitting a configuration 1009 for L1 measurements to the UE 1002 via the serving cell 1004.

In an aspect, the base station transmits a channel state information (CSI) resource configuration to configure the UE to perform the L1 measurements for at least one of a synchronization signal block (SSB), a channel state information reference signal (CSI-RS), or a positioning reference signal (PRS) from the one or more non-serving cells. The configuration to perform the L1 measurements may also include a non-serving cell identifier for each reference signal to be measured by the UE. For example, the non-serving cell identifier may include a physical cell identity (PCI) for the non-serving cell or a transmission reception point (TRP) identifier for the non-serving cell.

In an aspect, the base station configures the UE to perform the L1 measurements for a synchronization signal block (SSB) transmitted by the one or more non-serving cells and the configuration indicates at least one of: a carrier frequency for the SSB from the non-serving cell, a half-frame index for the SSB from the non-serving cell, a subcarrier spacing (SCS) for the SSB from the non-serving cell, a period for the SSB from the non-serving cell, a synchronization signal/physical broadcast channel block measurement time configuration (SMTC) window configuration for the SSB from the non-serving cell, a time offset for the SSB from the non-serving cell, or a transmission power for the SSB from the one or more non-serving cells. For example, the configuration may indicate a synchronization signal block (SSB) resource set that indicates a cell identifier for each SSB and the SSB resource set may include an SSB resource list indicating a sequence of SSB indexes and a cell identifier list that indicates a sequence of cell identifiers associated with the sequence of SSB indexes.

In an aspect, the base station may indicate for the UE to measure a serving cell synchronization signal block (SSB) without measuring a non-serving cell SSB when the base station transmits a channel state information (CSI) resource configuration without an associated cell identifier.

In another aspect, the base station may select between a first CSI resource configuration without the associated cell identifier and a second CSI resource configuration comprising a list of one or more cell identifiers.

In an aspect, the base station may configure the UE to perform the L1 measurements for a channel state information reference signal (CSI-RS) transmitted by the one or more non-serving cells and the configuration may include at least one of: a resource identifier (ID) for the CSI-RS from the non-serving cell, or a resource set ID for the CSI-RS from the non-serving cell.

In an aspect, the base station may configure the UE to perform the L1 measurements for a positioning reference signal (PRS) transmitted by the one or more non-serving cells and the configuration includes at least one of: a resource identifier (ID) for the PRS from the non-serving cell, or a resource set ID for the PRS from the non-serving cell.

In an aspect, the base station may configure the UE to perform the L1 measurements without reporting the L1 measurements for the one or more non-serving cells.

In another aspect, as shown in 720, the base station may transmit to the UE a report configuration to report the L1 measurements of the one or more reference signals from the one or more non-serving cells. The transmission of the report configuration may be performed by the configuration component 940 of the apparatus 902, for example. FIG. 10 illustrates an example of a serving cell 1004 transmitting a configuration 1010 for reporting the L1 measurements to the UE 1002.

For example, the report configuration may configure the UE to report an L1 metric comprising at least one of: a layer 1 reference signal received power (L1-RSRP) for the one or more reference signals of the non-serving cell, a layer 1 reference signal received quality (L1-RSRQ) for the one or more reference signals of the non-serving cell, or a layer 1 signal to interference and noise ratio (L1-SINR) for the one or more reference signals of the non-serving cell. The report received from the UE may indicate a reference signal identifier associated with each reported L1 metric. In an aspect, the reference signal identifier may comprise a resource identifier in a resource set associated with a cell identity.

In another aspect, the reference signal identifier may comprise a relative identifier based on a configured order of measurement of a plurality of reference signals.

In an aspect, the base station may configure the UE to report a subset of measured reference signals having a highest L1 metric or a lowest L1 metric across multiple cells associated with different physical cell identities (PCIs). For example, the base station may configure the UE to report a measured L1 metric for each of the subset of measured reference signals.

In another aspect, the base station may configure the UE to report the measured L1 metric for a first reference signal and a relative L1 metric value for each of the remaining reference signals of the subset of measured reference signals. For example, the relative L1 metric value may be relative to the measured L1 metric for the first reference signal.

In an aspect, the base station may configure the UE to report a subset of measured reference signals having a highest L1 metric or a lowest L1 metric per cell for at least a subset of multiple cells associated with different physical cell identities (PCIs). For example, the base station may configure the UE to report a measured L1 metric for each of the subset of measured reference signals.

In another aspect, the base station may configure the UE to report the measured L1 metric for a first reference signal and a relative L1 metric value for each of the remaining reference signals of the subset of measured reference signals. For example, the relative L1 metric value may be relative to the measured L1 metric for the first reference signal.

At 725, the base station receives from the UE via the serving cell a report comprising the L1 measurements of the one or more reference signals from the one or more non-serving cells. The reception of the report may be performed by the report component 942 of the apparatus 902 in FIG. 9. FIG. 10 illustrates an example of a serving cell 1004 receiving a report 1018 from the UE 1002 with L1 measurements based on at least one reference signal from the non-serving cell 1006.

In another aspect, the base station may activate a transmission configuration indication (TCI) state associated with one of the one or more non-serving cells based on the report comprising the L1 measurements of the one or more reference signals from the one or more non-serving cells. FIG. 10 illustrates an example of a serving cell 1004 transmitting a TCI state activation 1020 to a UE 1002.

In another aspect, the base station may configure the UE to perform the L1 measurements for a physical cell identity (PCI) set including the serving cell and one or more non-serving cells.

Figure 12:
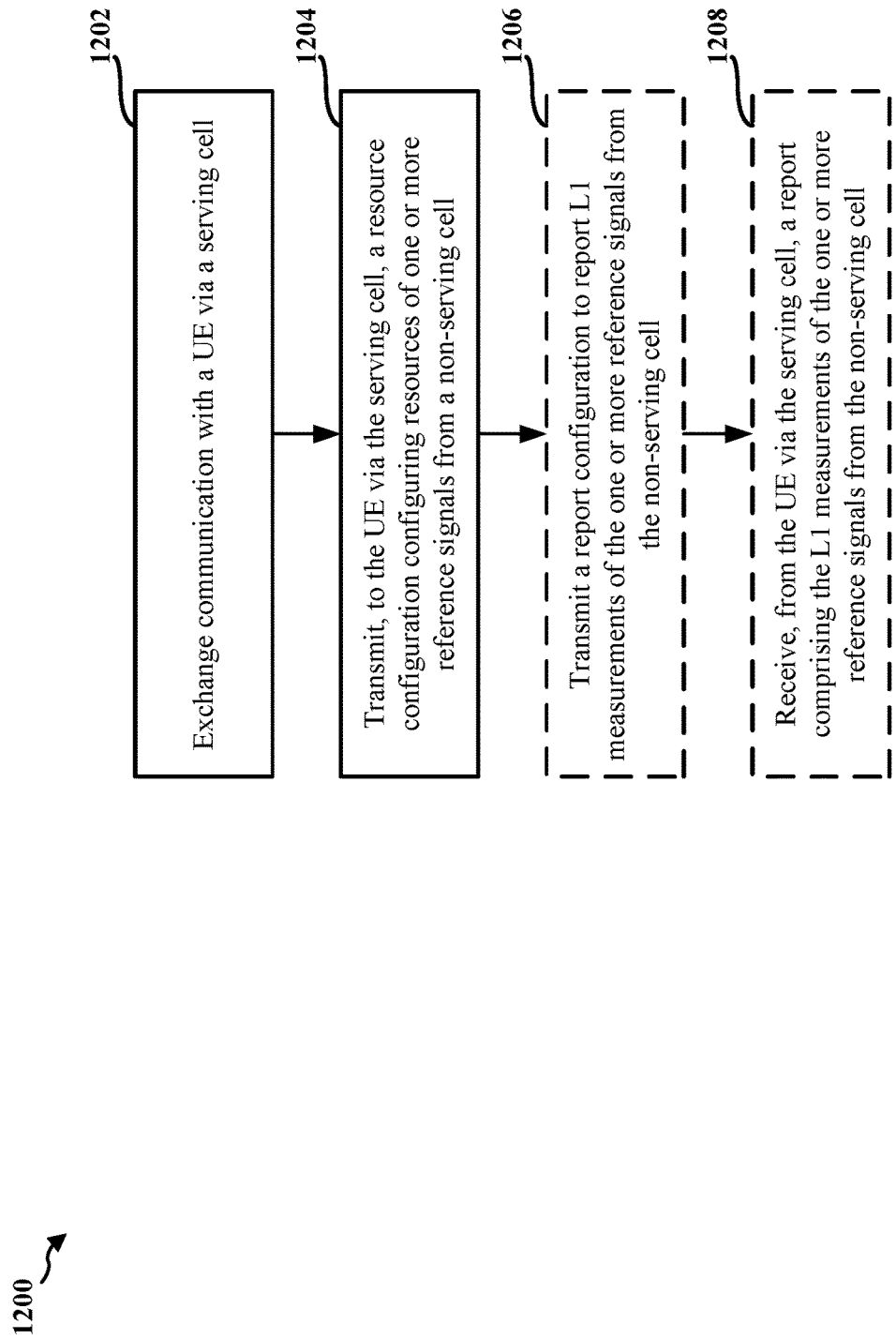
FIG. 12 is a flowchart of a method for wireless communication, in accordance with various aspects of the present disclosure.

FIG. 12 is a flowchart 1200 of a method of wireless communication. The method may be performed by a base station (e.g., the base station 102/180; the apparatus 902) to configure a UE (e.g., the UE 104; the apparatus 802) to report L1 measurements of a non-serving cell, in accordance with various aspects of the present disclosure. Optional aspects are illustrated with a dashed line. The method may enable the base station to support improved mobility for a UE.

At 1202, the base station exchanges communication with the UE via a serving cell. For example, the exchange of communication may be performed by a reception component 930 and/or a transmission component 934 of the apparatus 902. For example, FIG. 10 illustrates a serving cell 1004 exchanging communication 1007 with a UE 1002. The communication 1007 may include PDCCH, PDSCH, PUCCH, and/or PUSCH.

At 1204, the base station transmits, to the UE via the serving cell, a resource configuration configuring resources of one or more reference signals from a non-serving cell. The transmission may be performed, e.g., by a configuration component 940 of the apparatus 902 in FIG. 9, for example. FIG. 10 illustrates an example of a base station transmitting a configuration 1009 for L1 measurements to the UE 1002 via the serving cell 1004. The configuration 1009 may configure, at the UE 1002, resources of the one or more reference signals from the non-serving cell 1006.

In an aspect, the base station transmits a channel state information (CSI) resource configuration to configure the resources for at least one of a synchronization signal block (SSB), a channel state information reference signal (CSI-RS), or a positioning reference signal (PRS) from the non-serving cell. The resource configuration may also include a non-serving cell identifier for each reference signal to be measured by the UE. For example, the non-serving cell identifier may include a physical cell identity (PCI) for the non-serving cell or a transmission reception point (TRP) identifier for the non-serving cell.

In an aspect, the resource configuration may configure a synchronization signal block (SSB) resource set that indicates a cell identifier for each SSB. The SSB resource set may include an SSB resource list indicating a sequence of SSB indexes and a cell identifier list that indicates a sequence of cell identifiers associated with the sequence of SSB indexes.

In another aspect, as shown in 1206, the base station may transmit to the UE a report configuration to report L1 measurements of the one or more reference signals from the non-serving cell. The transmission of the report configuration may be performed by the configuration component 940 of the apparatus 902, for example. FIG. 10 illustrates an example of a serving cell 1004 transmitting a configuration 1010 for reporting the L1 measurements to the UE 1002.

For example, the report configuration may configure the UE to report an L1 metric comprising at least one of: a layer 1 reference signal received power (L1-RSRP) for the one or more reference signals of the non-serving cell, a layer 1 reference signal received quality (L1-RSRQ) for the one or more reference signals of the non-serving cell, or a layer 1 signal to interference and noise ratio (L1-SINR) for the one or more reference signals of the non-serving cell. The report received from the UE may indicate a reference signal identifier associated with each reported L1 metric. In an aspect, the reference signal identifier may comprise a resource identifier in a resource set associated with a cell identity.

At 1208, the base station may receive, from the UE via the serving cell, a report comprising the L1 measurements of the one or more reference signals from the non-serving cell. The reception of the report may be performed by a report component 942 of the apparatus 902 in FIG. 9. FIG. 10 illustrates an example of a serving cell 1004 receiving a report 1018 from the UE 1002 with L1 measurements based on at least one reference signal from the non-serving cell 1006.

FIG. 8 is a diagram 800 illustrating an example of a hardware implementation for an apparatus 802. The apparatus 802 is a UE and includes a cellular baseband processor 804 (also referred to as a modem) coupled to a cellular RF transceiver 822 and one or more subscriber identity modules (SIM) cards 820, an application processor 806 coupled to a secure digital (SD) card 808 and a screen 810, a Bluetooth module 812, a wireless local area network (WLAN) module 814, a Global Positioning System (GPS) module 816, and a power supply 818. The cellular baseband processor 804 communicates through the cellular RF transceiver 822 with the UE 104 and/or base station 102/180. The cellular baseband processor 804 may include a computer-readable medium/memory. The computer-readable medium/memory may be non-transitory. The cellular baseband processor 804 is responsible for general processing, including the execution of software stored on the computer-readable medium/memory. The software, when executed by the cellular baseband processor 804, causes the cellular baseband processor 804 to perform the various functions described supra. The computer-readable medium/memory may also be used for storing data that is manipulated by the cellular baseband processor 804 when executing software. The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804. The cellular baseband processor 804 may be a component of the UE 350 and may include the memory 360 and/or at least one of the TX processor 368, the RX processor 356, and the controller/processor 359. In one configuration, the apparatus 802 may be a modem chip and include just the cellular baseband processor 804, and in another configuration, the apparatus 802 may be the entire UE (e.g., see the UE 350 of FIG. 3) and include the aforediscussed additional modules of the apparatus 802.

The communication manager 832 includes a configuration component 840 that is configured to receive from the serving cell a configuration to perform L1 measurements on reference signals from one or more non-serving cells, e.g., as described in connection with step 610 of FIG. 6 and receive from the serving cell a report configuration to report to the serving cell the L1 measurements of the reference signals from the one or more non-serving cells, e.g., as described in connection with step 625 of FIG. 6. The configuration component 840 may also be configured to receive, from a serving cell of a base station, a resource configuration configuring resources of one or more reference signals from a non-serving cell, e.g., as described in connection with step 1102 of FIG. 11. The configuration component 840 may also be configured to receive a report configuration to report the L1 measurements of the one or more reference signals from the non-serving cell, as described in connection with step 1104 of FIG. 11. The communication manager 832 further includes a reference signal component 842 that receives input in the form of a list of one or more reference signals to measure from the configuration component 840 and is configured to receive one or more reference signals from one or more non-serving cells, e.g., as described in connection with step 615 of FIG. 6. The reference signal component 842 may also be configured to receive the one or more reference signals from the non-serving cell, e.g., as described in connection with step 1106 of FIG. 11. The communication manager 832 further includes an L1 measurement component 844 that receives input in the form of a list of the reference signals to measure from the configuration component 840 and is configured to perform L1 measurements on the one or more reference signals received from one or more non-serving cells, e.g., as described in connection with step 620 of FIG. 6. The L1 measurement component 844 may also be configured to perform L1 measurements on the one or more reference signals received from the non-serving cell based on the resource configuration received from the base station, e.g., as described in connection with step 1108 of FIG. 11. The communication manager 832 also includes a report component 846 that receives input in the form of a list of the reference signals to report from the configuration component 840 and is configured to transmit to the serving cell a report of the L1 measurements of the reference signals from the non-serving cells, e.g., as described in connection with step 630 of FIG. 6. The report component 846 may also be configured to report, to the serving cell, the L1 measurements of the one or more reference signals received from the non-serving cell, e.g., as described in connection with step 1110 of FIG. 11.

The apparatus may include additional components that perform each of the blocks of the algorithm in the aforementioned flowcharts of FIGS. 6 and 11. As such, each block in the aforementioned flowcharts of FIGS. 6 and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the cellular baseband processor 804, includes means for receiving a configuration from a base stations/serving cell, means for receiving a report configuration from a base stations/serving cell, means for receiving one or more reference signals from one or more non-serving cells, and means for transmitting a report of L1 measurements to the base station/serving cell. In another configuration, the apparatus 802 may include means for receiving, from a serving cell of a base station, a resource configuration configuring resources of one or more reference signals from a non-serving cell, means for receiving the one or more reference signals from the non-serving cell, and means for performing L1 measurements on the one or more reference signals received from the non-serving cell based on the resource configuration received from the base station. The aforementioned means may be one or more of the aforementioned components of the apparatus 802 configured to perform the functions recited by the aforementioned means. As described supra, the apparatus 802 may include the TX processor 368, the RX processor 356, and the controller/processor 359. As such, in one configuration, the aforementioned means may be the TX processor 368, the RX processor 356, and the controller/processor 359 configured to perform the functions recited by the aforementioned means.

Figure 9:
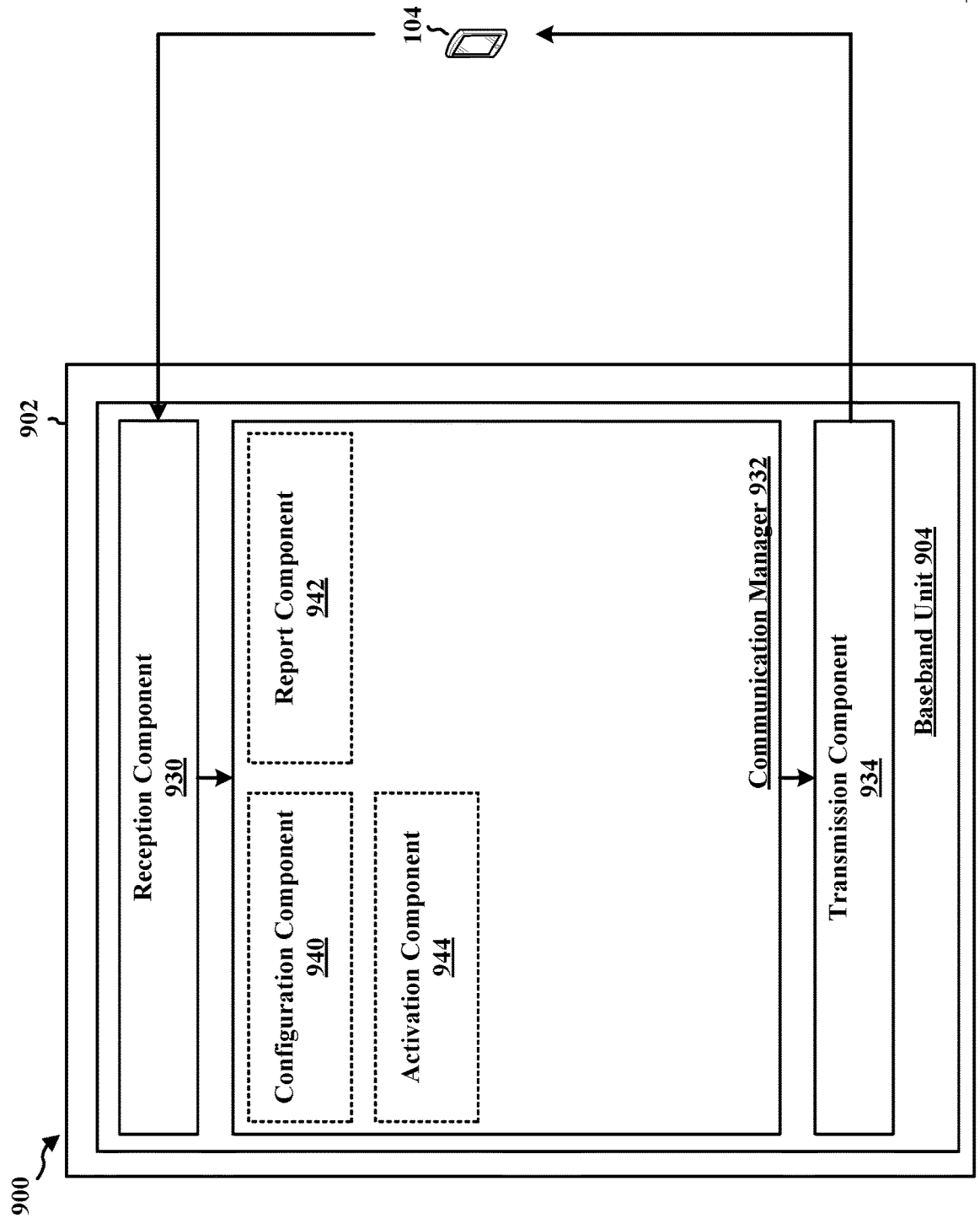
FIG. 9 is a diagram illustrating an example of a hardware implementation for an example apparatus.

FIG. 9 is a diagram 900 illustrating an example of a hardware implementation for an apparatus 902. The apparatus 902 is a base station and includes a baseband unit 904. The baseband unit 904 may communicate through a cellular RF transceiver with the UE 104. The baseband unit 904 may include a computer-readable medium/memory. The baseband unit 904 is responsible for general processing, including the execution of software stored on the computer-readable medium/memory. The software, when executed by the baseband unit 904, causes the baseband unit 904 to perform the various functions described supra. The computer-readable medium/memory may also be used for storing data that is manipulated by the baseband unit 904 when executing software. The baseband unit 904 further includes a reception component 930, a communication manager 932, and a transmission component 934. The communication manager 932 includes the one or more illustrated components. The components within the communication manager 932 may be stored in the computer-readable medium/memory and/or configured as hardware within the baseband unit 904. The baseband unit 904 may be a component of the base station 310 and may include the memory 376 and/or at least one of the TX processor 316, the RX processor 370, and the controller/processor 375.

The communication manager 932 includes a configuration component 940 that transmits a configuration to the UE via the serving cell, the configuration operable to configure the UE to perform L1 measurements on reference signals from a non-serving cell, e.g., as described in connection with step 715 of FIG. 7. The configuration component 940 may also be configured to transmit, to the UE via the serving cell, a resource configuration configuring resources of one or more reference signals from a non-serving cell, e.g., as described in connection with 1204 of FIG. 12. The configuration component 940 may also be configured to transmit a report configuration to report L1 measurements of the one or more reference signals from the non-serving cell, e.g., as described in connection with 1206 of FIG. 12. The communication manager 932 further includes a report component 942 that transmits a report configuration to the UE via the serving cell, the report configuration operable to configure the UE to report the L1 measurements of the reference signals from a non-serving cell, e.g., as described in connection with step 720 of FIG. 7. The report component 942 may also be configured to receive, from the UE via the serving cell, a report comprising the L1 measurements of the one or more reference signals from the non-serving cell, e.g., as described in connection with 1208 of FIG. 12. The communication manager 932 further includes an activation component 944 that is configured to activate a transmission configuration indication (TCI) state associated with the non-serving cell based on the report comprising the L1 measurements of the reference signals from the non-serving cell, e.g., as described in connection with step 730 of FIG. 7.

The apparatus may include additional components that perform each of the blocks of the algorithm in the aforementioned flowcharts of FIGS. 7 and 12. As such, each block in the aforementioned flowcharts of FIGS. 7 and 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the baseband unit 904, includes means for communicating with the UE, means for transmitting a configuration and a report configuration to the UE, means for receiving a report from the UE and means for activating a TCI state. In another configuration, the apparatus 902 may include means for exchanging communicating with a UE via a serving cell, and means to transmit, to the UE via the serving cell, a resource configuration configuring resources of one or more reference signals from a non-serving cell. The aforementioned means may be one or more of the aforementioned components of the apparatus 902 configured to perform the functions recited by the aforementioned means. As described supra, the apparatus 902 may include the TX processor 316, the RX processor 370, and the controller/processor 375. As such, in one configuration, the aforementioned means may be the TX processor 316, the RX processor 370, and the controller/processor 375 configured to perform the functions recited by the aforementioned means.

In summary, wireless communication is accomplished in part by a base station configuring a UE to perform L1 measurements of one or more reference signals from one or more non-serving cells and transmit a report of L1 measurements to the base station, and the base station may activate a TCI state associated with one of the non-serving cells in connection with inter-cell mobility. Some advantages realized by using L1 measurements include improving mobility of the UE via beam switching across serving and non-serving cells, which is an improvement over conventional (R16) mobility solutions. In some aspects, the base station may identify in its configuration of the UE, a set of non-serving cells for which the UE performs L1 measurements on their respective reference signals. Additionally, the base station may also identify in its configuration of the UE the particular reference signals for which the UE performs the L1 measurements. The base station may also identify in its configuration of the UE the particular characteristics to be provided from a particular reference signal for which the UE performs the L1 measurements.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication at a user equipment (UE), comprising:
   memory; and
   at least one processor coupled to the memory and the at least one processor configured to cause the UE to:
      receive, from a serving cell, a resource configuration configuring resources of one or more reference signals, wherein the resource configuration includes a cell identity of a non-serving cell for the one or more reference signals that are from the non-serving cell but does not include a cell identity of a serving cell for the one or more reference signals that are from the serving cell;
      receive the one or more reference signals from the non-serving cell;
      perform layer 1 (L1) measurements of the non-serving cell on the one or more reference signals received from the non-serving cell based on the resource configuration; and
      report, to the serving cell, the L1 measurements of the non-serving cell.

2. The apparatus of claim 1, wherein the resource configuration includes a non-serving cell identifier for each reference signal to be measured by the UE.

3. The apparatus of claim 2, wherein the non-serving cell identifier includes a physical cell identity (PCI) for the non-serving cell or a transmission reception point (TRP) identifier for the non-serving cell.

4. The apparatus of claim 1, wherein the one or more reference signals comprises at least one of a synchronization signal block (SSB), a channel state information reference signal (CSI-RS), or a positioning reference signal (PRS) from the non-serving cell.

5. The apparatus of claim 1, wherein the resource configuration configures a synchronization signal block (SSB) resource set that indicates a cell identifier for each SSB.

6. The apparatus of claim 5, wherein the SSB resource set includes an SSB resource list indicating a sequence of SSB indexes and a cell identifier list that indicates a sequence of cell identifiers associated with the sequence of SSB indexes.

7. The apparatus of claim 1, wherein the at least one processor is further configured to cause the UE to:
   receive a report configuration to report the L1 measurements of the non-serving cell, the report, to the serving cell, of the L1 measurements of the non-serving cell being based, at least in part, on the report configuration.

8. The apparatus of claim 7, wherein the report configuration configures the UE to report an L1 metric comprising at least one of:
   a layer 1 reference signal received power (L1-RSRP) for the one or more reference signals of the non-serving cell,
   a layer 1 reference signal received quality (L1-RSRQ) for the one or more reference signals of the non-serving cell, or
   a layer 1 signal to interference and noise ratio (L1-SINR) for the one or more reference signals of the non-serving cell.

9. The apparatus of claim 1, wherein the at least one processor is further configured to:
   receive a transmission configuration indication (TCI) activation of a TCI state based on the one or more reference signals from the non-serving cell.

10. The apparatus of claim 1, wherein, to report the L1 measurements of the non-serving cell, the at least one processor is further configured to:
    report a highest L1 metric or a lowest L1 metric across multiples cells, including the non-serving cell, associated with different cell identities.

11. The apparatus of claim 1, wherein, to report the L1 measurements of the non-serving cell, the at least one processor is further configured to:
    report an L1 metric value for a first reference signal of the one or more reference signals and a relative L1 metric value for a remaining reference signal of the one or more reference signals.

12. A method of wireless communication at a user equipment (UE) served by a serving cell, comprising:
    receiving, from the serving cell, a resource configuration configuring resources of one or more reference signals, wherein the resource configuration includes a cell identity of a non-serving cell for the one or more reference signals that are from the non-serving cell but does not include a cell identity of a serving cell for the one or more reference signals that are from the serving cell;
    receiving the one or more reference signals from the non-serving cell;
    performing layer 1 (L1) measurements of the non-serving cell on the one or more reference signals received from the non-serving cell based on the resource configuration; and
    reporting, to the serving cell, the L1 measurements of the non-serving cell.

13. The method of claim 12, wherein the resource configuration includes a non-serving cell identifier for each reference signal to be measured by the UE.

14. The method of claim 13, wherein the non-serving cell identifier includes a physical cell identity (PCI) for the non-serving cell or a transmission reception point (TRP) identifier for the non-serving cell.

15. The method of claim 12, wherein the one or more reference signals comprises at least one of a synchronization signal block (SSB), a channel state information reference signal (CSI-RS), or a positioning reference signal (PRS) from the non-serving cell.

16. The method of claim 12, wherein the resource configuration configures a synchronization signal block (SSB) resource set that indicates a cell identifier for each SSB.

17. The method of claim 12, further comprising:
receiving a report configuration to report the L1 measurements of the non-serving cell, the reporting, to the serving cell, of the L1 measurements of the non-serving cell being based, at least in part, on the report configuration.

18. The method of claim 16, wherein the SSB resource set includes an SSB resource list indicating a sequence of SSB indexes and a cell identifier list that indicates a sequence of cell identifiers associated with the sequence of SSB indexes.

19. The method of claim 17, wherein the report configuration configures the UE to report an L1 metric comprising at least one of:
a layer 1 reference signal received power (L1-RSRP) for the one or more reference signals of the non-serving cell,
a layer 1 reference signal received quality (L1-RSRQ) for the one or more reference signals of the non-serving cell, or
a layer 1 signal to interference and noise ratio (L1-SINR) for the one or more reference signals of the non-serving cell.

20. The method of claim 12, further comprising:
receiving a transmission configuration indication (TCI) activation of a TCI state based on the one or more reference signals from the non-serving cell.

21. The method of claim 12, wherein reporting the L1 measurements of the non-serving cell further comprises:
reporting a highest L1 metric or a lowest L1 metric across multiples cells, including the non-serving cell, associated with different cell identities.

22. The method of claim 12, wherein reporting the L1 measurements of the non-serving cell further comprises:
reporting an L1 metric value for a first reference signal of the one or more reference signals and a relative L1 metric value for a remaining reference signal of the one or more reference signals.

* * * * *